(No Model.) 2 Sheets—Sheet 1.

O. OHLSSON.
CHURN.

No. 528,681. Patented Nov. 6, 1894.

Witnesses  Inventor
Oscar A. Michel  Olof Ohlsson,
Chas R Michel  By Draker Co. Atty's.

(No Model.) 2 Sheets—Sheet 2.

O. OHLSSON.
CHURN.

No. 528,681. Patented Nov. 6, 1894.

Witnesses
Oscar A. Michel
Chas R. Michel

Inventor
Olof Ohlsson,
By Draket & Co Atty's

UNITED STATES PATENT OFFICE.

OLOF OHLSSON, OF NEWARK, NEW JERSEY.

CHURN.

SPECIFICATION forming part of Letters Patent No. 528,681, dated November 6, 1894.

Application filed September 16, 1890. Serial No. 365,158. (No model.)

*To all whom it may concern:*

Be it known that I, OLOF OHLSSON, a subject of the King of Sweden and Norway, residing at Newark, in the county of Essex and State of New Jersey, have invented certain new and useful Improvements in Churns; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to facilitate the operation of churning the cream; after it has been separated from the milk, and of subsequently extracting the butter therefrom and discharging the butter and the buttermilk into separate vessels; and to secure other advantages hereinafter referred to.

The invention consists of a churn embodying novel features of construction and combination of parts substantially as disclosed herein.

Figure 1:
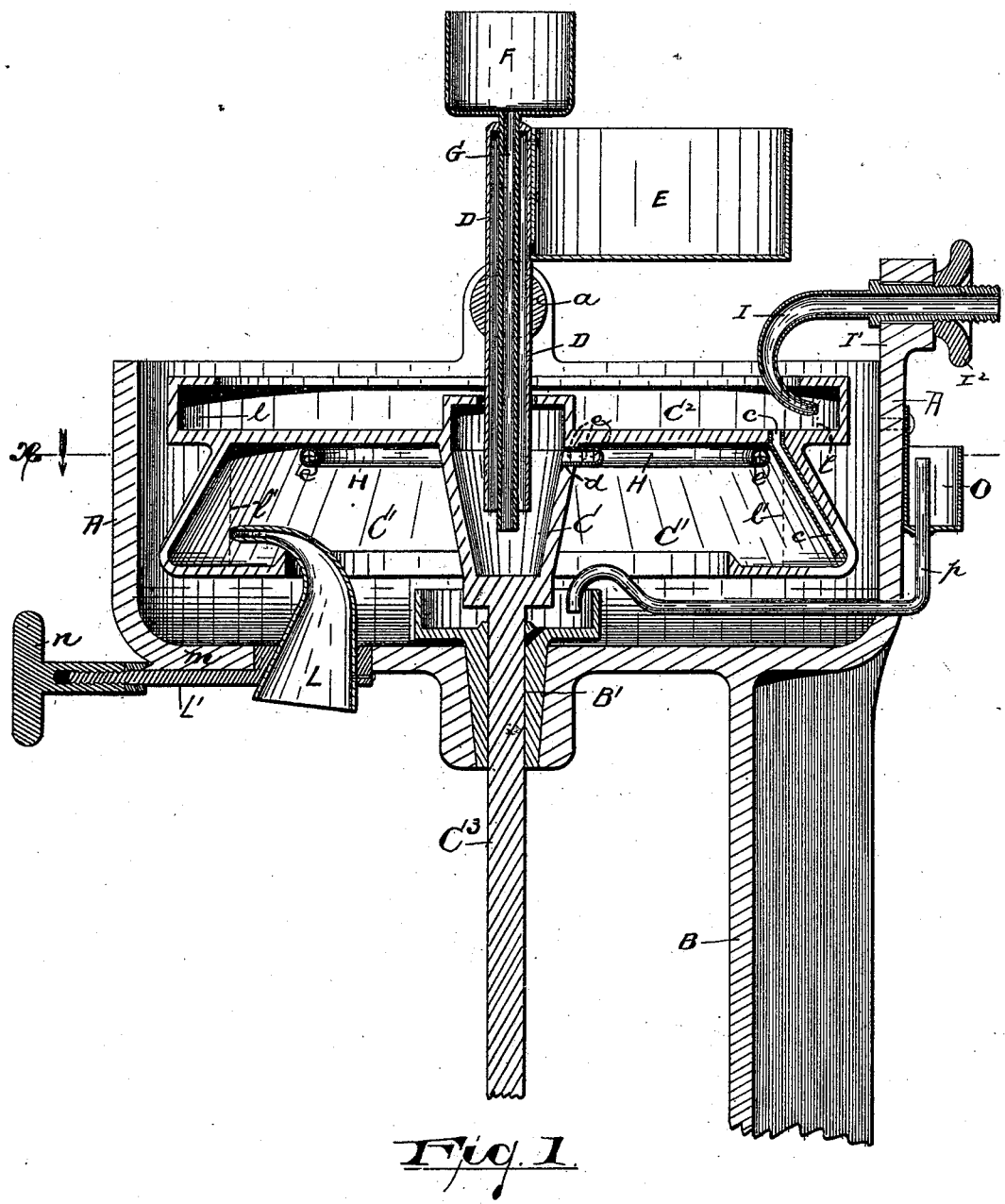
Figure 3:
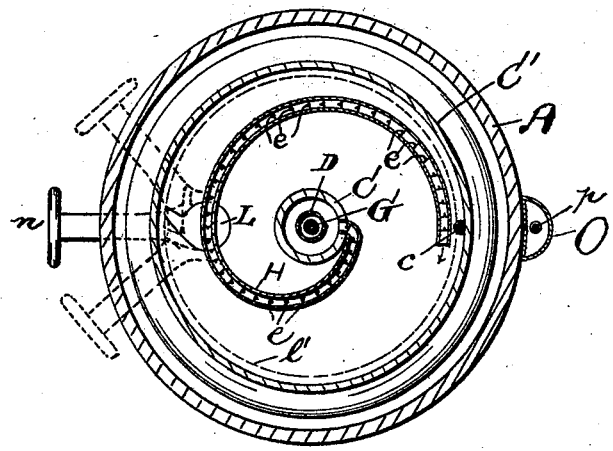
Figure 2:
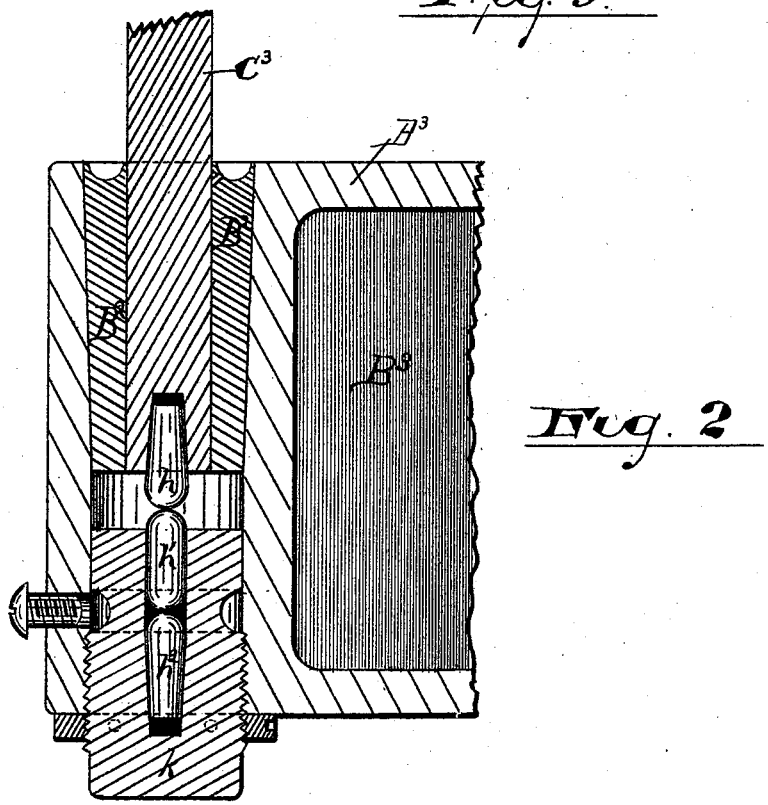

Referring to the accompanying drawings, in which like letters of reference indicate corresponding parts in each figure where they occur, Figure 1, represents a vertical transverse section of a churn embodying my improvement, the bottom portion being broken off and shown, enlarged, in Fig. 2. Fig. 3, is a horizontal transverse section taken through line $x$ of Fig. 1, looking downward.

In said drawings A, indicates an outer stationary casing, supported by a suitable bracket or standard B, firmly secured upon the floor or other fixture, and in which the principal portions of the churning mechanism are inclosed.

C, indicates a rotatable receptacle for the cream, which flows therein through a conduit, D, from a tank or feeder E, which connects therewith near the top; said conduit being supported by a suitable bar or fixture at the top of the casing A, as indicated in the drawings.

F, indicates a color-cup from which coloring matter is supplied to the cream-receptacle, through a conduit, G, which connects with or passes through the aforesaid conduit D, upon which the said color-cup is supported.

$C'$, and $C^2$ indicate two chambers located one above the other and connecting with each other by a tube or conduit, $c$, which is located at the side of the chamber $C'$ and extends nearly to the bottom thereof, as indicated in Fig. 1. To the bottom of the chamber $C^2$ is soldered or otherwise secured a tube or pipe H which connects with the cream receptacle C, at $d$, and projects spirally or otherwise therefrom to a point near the side of the chamber $C'$, as indicated in Fig. 1. Said tube is provided on the inside with a series of crossed bars or pins $e$, the purpose of which will be hereinafter set forth. Said chambers C $C'$ and $C^2$, are all connected together and supported by or upon a vertical shaft $C^3$ which rotates in suitable boxes or bearings $B'$ and $B^2$ the former being located at the bottom of the casing A, and the latter in an arm $B^3$, Fig. 2, projecting from the standard B. In the bottom end of said shaft is inserted a bearing-pin $h$, the head of which projects below the end of the shaft, and is rounded. Said bearing engages with an intermediate bearing $h'$, having rounded ends and fitting snugly but loosely in a socketed and screw-threaded plug $k$, which is screwed into the lower side of said arm $B^3$. Said intermediate bearing rests upon the rounded head of a pin $h^2$, seated firmly in said socketed plug, below the intermediate bearing aforesaid, all as indicated in Fig. 2. Said screw-plug is designed to be screwed upward or downward as may be required, and to be locked or keyed in position, if desired.

I, indicates a pipe or conduit, one end of which is bent and enters the upper chamber $C^2$ terminating at a dotted line, $l$, which indicates the butter-milk-line, in said chamber and is ground or otherwise finished to a knife edge thereat. Said conduit is supported by an arm $I'$ projecting from casing A and is adjustable therein, it being capable of being moved in or out, so as to bring the end of the pipe into contact with the milk, as required, and secured in position by means of a thumb-screw $I^2$ as will be understood upon reference to Fig. 1.

L indicates a pipe or conduit one end of which is bent and enters the chamber $C'$, terminating at a dotted line $l'$, which indicates the butter-line in said chamber, and is also finished to a knife edge thereat. Said pipe or conduit is supported by and secured in a carrier L' having a hub $m$ seated and working in the bottom of the casing A, and capable of being partially rotated by means of a handle $n$, as will be understood by reference to Figs. 1 and 3, whereby the tube can be turned so as to present the knife-edge of the pipe to the butter in such a position as will enable it to cut and gather the butter to the best advantage, its movement being indicated by dotted lines in the latter figure. The knife-end of the conduit I is also bent laterally to bring it at an acute angle with the milk-line so as to facilitate the passage of the butter-milk therein, as will be understood.

O, indicates an oil-cup, secured to the casing A, from which oil is conducted to the shaft-bearings by means of a conduit, $p$, to lubricate the same, as will be understood.

It will be noted that the casing A and the chambers C, C' and $C^2$ are circular in horizontal transverse section and that said chambers, when the machine is in operation rotate at the rate of about six or seven thousand revolutions per minute, the machine being driven by means of a belt connecting a driving pulley with a pulley and keyed to the shaft $b^3$ (not shown), in the usual manner.

The operation is as follows: The machine being started the cream in the feeder E flows through the conduit D into the chamber C from whence it is driven, by centrifugal force, into and through the churning pipe or tube H with great velocity, and is delivered into the separating chamber C'. In this chamber, by the same force, the globules of butter are completely extracted from the cream, and gather into a thin vertical film or wall, at the dotted line $l'$, the residue or butter-milk which is heavier than the butter being driven back to the extreme limit of said chamber and from thence is forced up through the conduit $c$ into the chamber $C^2$ against the side or wall thereof and occupying the space back of the butter wall, indicated by the dotted line $l$ where it is caught by the butter-milk conduit I and delivered thereby into a vessel, (not shown) located at the mouth of said conduit to receive it, the butter, in the meantime being caught in like manner by the butter conduit L and delivered by it into a vessel, (not shown) located at the mouth of said conduit to receive it.

By means of this improvement I am enabled to produce more and better butter in a given time from a given quantity of cream than by any other churn of which I have any knowledge.

It will be seen from the above, that the violent passage of the cream through the transverse bars in the pipe H must result in thoroughly churning the same, so that when it enters the separating chamber C' it will be in such a condition that the butter-milk will be easily and entirely expelled or separated from the globules of butter automatically by the centrifugal force generated by the rapid rotation of the said chamber as described.

Having thus described my invention, what I claim as new is—

1. In a centrifugal churn, the combination, with an outer stationary casing, of a cream chamber; a shaft upon which said cream-chamber is mounted; chambers C' and $C^2$ carried by and connecting with said cream-chamber; a pipe having transverse bars on the inside thereof and connecting with said cream-chamber and the chamber C'; a conduit connecting said chambers C' and $C^2$ and means for collecting and delivering the butter and the butter-milk into vessels arranged to receive the same as described for the purposes set forth.

2. In a centrifugal churn, the combination of a casing, a shaft mounted therein carrying a cream receptacle, a feeder for supplying cream to said receptacle, the upper and lower chambers, the pipe connecting said chambers, the pipe leading from the cream receptacle into the lower or separating chamber, and having the bars on the inside thereof, the pipe or conduit having its inner end in the upper separating chamber, and the pipe or conduit entering the lower separating chamber, substantially as and for the purpose set forth.

3. In a centrifugal churn, the combination of a separating-chamber having an opening in the bottom thereof, a cream-receptacle projecting through said opening and a pipe or tube connecting the said chamber and receptacle and having its interior provided with a series of obstructions, for the purposes set forth.

4. In a centrifugal churn the combination of the casing, the shaft mounted therein and carrying the cream receptacle, the feeder and color supplying device for said receptacle, the upper and lower chambers, the pipe connecting said chambers, the pipe leading from the cream receptacle to the lower or separating chamber and having means for churning the cream, the pipes or conduits secured to the casing and entering the separating chamber, and mechanism for rotating the shaft, all arranged and adapted to operate as described.

5. In a centrifugal churn, the combination of a cream receptacle, upper and lower chambers communicating with each other, a pipe or conduit leading from the cream receptacle to the lower chamber, said pipe having devices for churning the cream, and mechanism for revolving the said receptacle, chambers and pipe, for the purpose described.

In testimony that I claim the foregoing I have hereunto set my hand this 13th day of September, 1890.

OLOF OHLSSON.

Witnesses:
 OLIVER DRAKE,
 OSCAR A. MICHEL.